United States Patent
Lee et al.

(10) Patent No.: US 7,417,404 B2
(45) Date of Patent: Aug. 26, 2008

(54) POWER RECHARGER FOR USE WITH ROBOT CLEANER

(75) Inventors: Ju-sang Lee, Gwangju (KR); Jang-youn Ko, Gwangju (KR); Jeong-gon Song, Gwangju (KR); Ki-man Kim, Gwangju (KR); Sam-jong Jeung, Gwangju (KR); Yun-sup Hwang, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 357 days.

(21) Appl. No.: 11/026,988

(22) Filed: Dec. 30, 2004

(65) Prior Publication Data

US 2005/0253555 A1    Nov. 17, 2005

(30) Foreign Application Priority Data

May 17, 2004    (KR) ............... 10-2004-0034670

(51) Int. Cl.
*H02J 7/00*    (2006.01)
*H02J 7/02*    (2006.01)
*G06F 19/00*    (2006.01)
*B25J 5/00*    (2006.01)

(52) U.S. Cl. .............. 320/115; 320/111; 700/245; 318/568.12

(58) Field of Classification Search ............. 320/107, 320/111, 115; 700/245, 900; 439/151, 152, 439/177, 214
See application file for complete search history.

(56) References Cited

U.S. PATENT DOCUMENTS

| | | | |
|---|---|---|---|
| 5,284,522 A | 2/1994 | Kobayashi et al. | |
| 5,638,572 A * | 6/1997 | Canni Ferrari | 15/323 |
| 5,646,494 A | 7/1997 | Han | |
| 6,676,428 B2 * | 1/2004 | Burton | 439/270 |
| 2002/0153185 A1 * | 10/2002 | Song et al. | 180/167 |
| 2002/0178519 A1 * | 12/2002 | Zarlengo | 15/22.2 |
| 2005/0083011 A1 * | 4/2005 | Yang et al. | 320/107 |
| 2005/0225292 A1 * | 10/2005 | Damlamian et al. | 320/128 |

FOREIGN PATENT DOCUMENTS

| | | |
|---|---|---|
| CN | 1185096 | 6/1998 |
| CN | 1493247 | 5/2004 |
| DE | 2826741 | 12/1979 |
| DE | 8907942 | 8/1989 |
| FR | 2846587 | 4/2003 |
| GB | 2398647 | 8/2004 |
| GB | 2407651 | 5/2005 |
| JP | 2001149289 | 5/2001 |
| KR | 93 16326 | 7/1993 |
| KR | 10-2004 0039094 | 5/2004 |
| WO | WO96/22724 | 8/1996 |
| WO | WO 9938056 | 7/1999 |
| WO | WO 9938237 | 7/1999 |

* cited by examiner

*Primary Examiner*—Akim Enayet Ullah
*Assistant Examiner*—Johali A Torres Ruiz
(74) *Attorney, Agent, or Firm*—Ladas & Parry LLP

(57) ABSTRACT

A power recharger for use with a robot cleaner has a recharging terminal to which a battery terminal of the robot cleaner is docked and an anchor member on a rear side of the body of the recharging unit. The anchor member fills in the space defined between the wall of the room and the power recharger. The anchor member therefore securely supports the power recharger in the battery recharging process.

3 Claims, 4 Drawing Sheets

POWER RECHARGER FOR USE WITH ROBOT CLEANER

CROSS-REFERENCE TO RELATED APPLICATIONS

This application claims the benefit of Korean Patent Application No. 2004-34670 filed May 17, 2004, in the Korean Intellectual Property Office, the disclosure of which is incorporated herein by reference.

FIELD OF THE INVENTION

The present invention relates to an automatic robot cleaner. More particularly, this invention relates to a power recharger for use with a robotic cleaner, which is installed as a station to which the robot cleaner can return for battery recharging during a cleaning operation.

BACKGROUND OF THE INVENTION

Generally, a robotic cleaner automatically runs around one or more rooms to perform cleaning operations. Because it runs inside of a building, an automatic robot cleaner must be electrically powered and the preferred source of electrical energy is a rechargeable battery mounted in the robotic cleaner by which the robotic cleaner can be operated cordlessly. While performing the automatic running and cleaning operation, the robot cleaner determines whether it needs its battery recharged, usually checking the level of the remaining power of the battery through, for example, the measurement of voltage from the battery, and if determining so, the robot cleaner returns to the station, for example, at the corner of the room where the power recharger 20 is positioned. Therefore, the battery in the robot cleaner can be recharged automatically.

As shown in FIG. 1, most rooms have a molding known as a "baseboard" 1 that is attached around the lower part of a room's walls. As the power recharger 20 of the robot cleaner 10 is usually stationed at the corner of the room, there usually occurs a gap 2 between the power recharger 20 and the walls 3. When a robotic cleaner 10 needs recharging and runs itself to the recharger 20, the robot cleaner's 10 contact with the charger terminals 22 can jostle the recharger unit 20 by the force transmitted by the robot cleaner 10 through the terminals 22, which are located above the top of the baseboard 1. As a result, docking of the rechargeable battery terminal 11 of the robot cleaner 10 and the power terminal 22 of the power recharger 20 becomes unstable.

Thus, there exists a need to squarely support a recharging station against a wall such that a wall baseboard or other structure that extends away from a room wall can be compensated for.

SUMMARY OF THE INVENTION

The present invention has been developed in order to solve the above-identified shortcomings of the prior art. An aspect of the present invention is to provide a power recharger for use with a robot cleaner and which provides stable battery recharging operation.

The above aspects and/or other features of the present invention can substantially be realized by providing a power recharger for use with a robot cleaner, comprising a recharging unit stationed at a predetermined location of a room, and having a recharging terminal to which a battery terminal of the automatically-running robot cleaner is docked. An anchor member formed on the body of the recharging unit, laterally supports the power recharger against a room wall whenever the power recharger is bumped or collided with.

In a preferred embodiment, an anchor member protrudes from the rear side of the body of the recharging unit and is lengthened or shortened to span the thickness of a baseboard or other wall-mounted structure.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Figure 1:
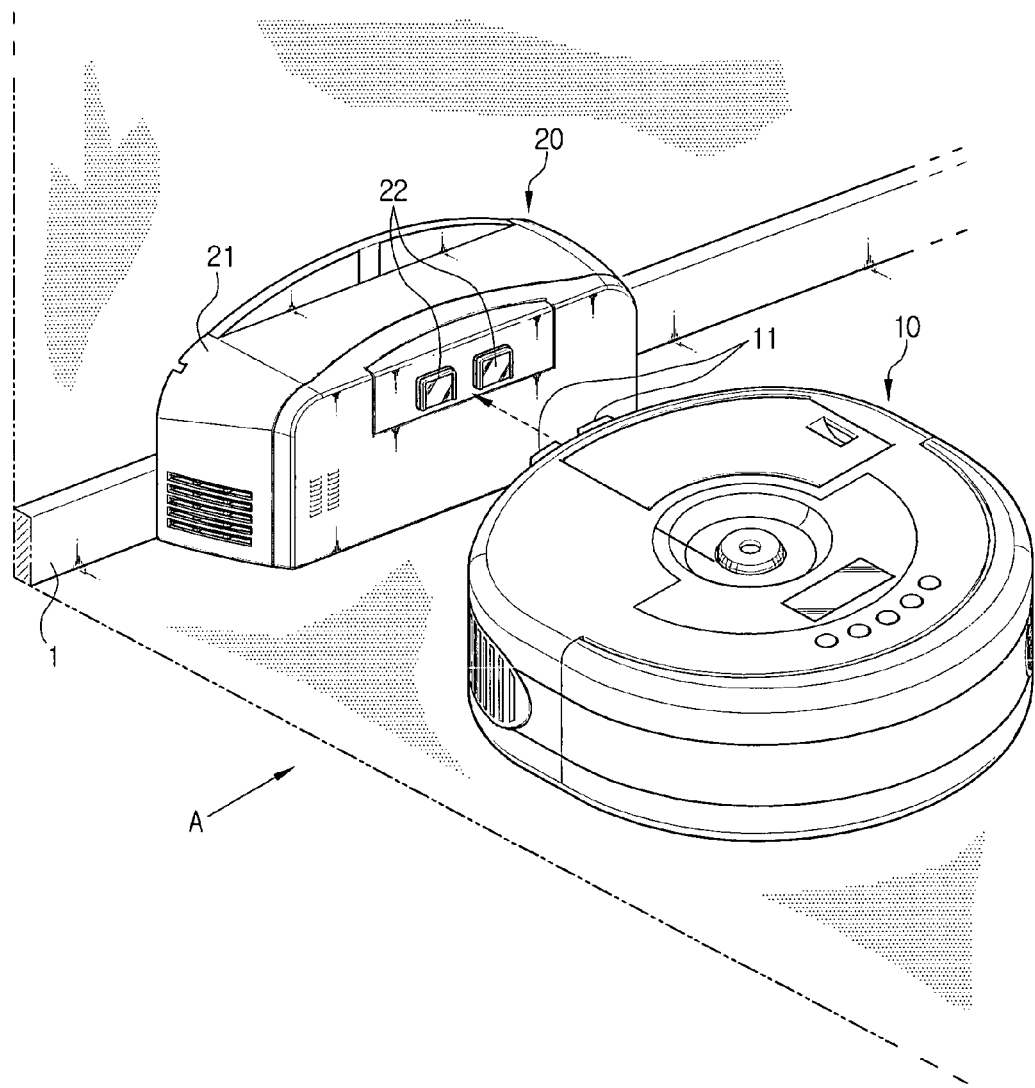
FIG. 1 is a perspective view of one example of a conventional power recharger for use with a robot cleaner.
Figure 2:
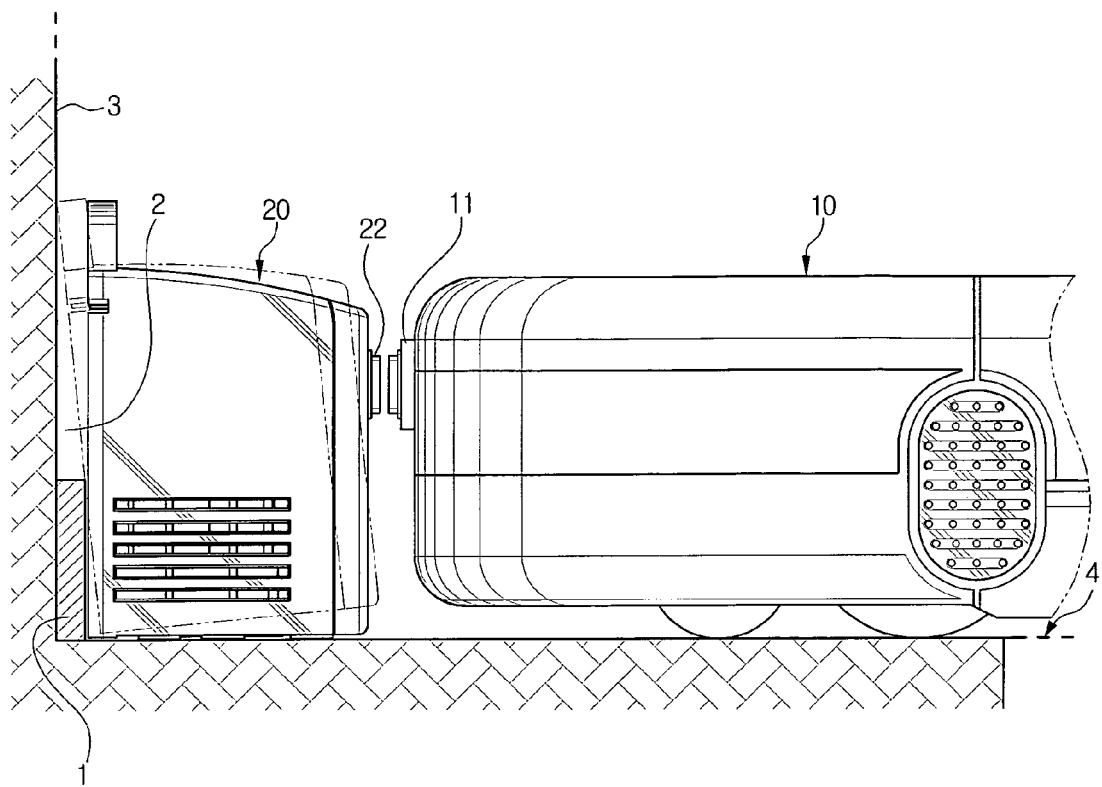
FIG. 2 is a side view showing the power recharger of FIG. 1 from the arrow 'A' direction.

Certain embodiments of the present invention will be described in greater detail with reference to the accompanying drawings.

In the following description, reference numerals are used for the same elements in different drawings. The embodiments described herein are only examples and not intended to be limiting. Rather, the invention disclosed herein is set forth in the appurtenant claims. Also, well-known functions and structures are not described in detail since they would tend to obscure the invention in unnecessary detail.

Figure 3:
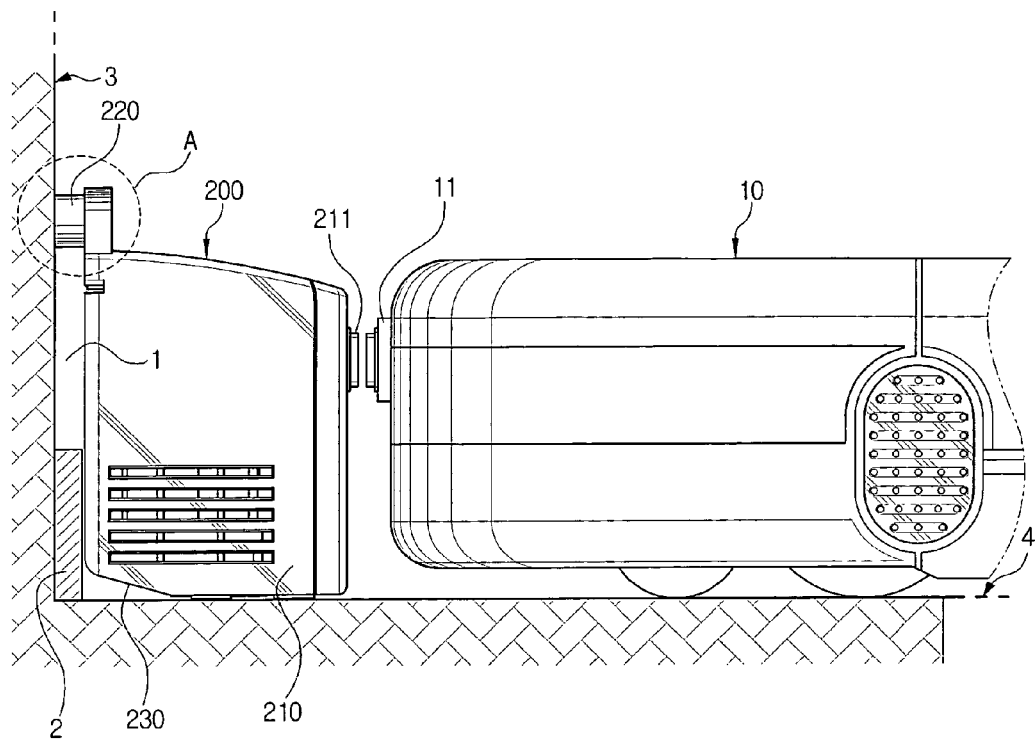
FIG. 3 is a side view of a power recharger for use with a robot cleaner according to an embodiment of the present invention.

Referring to FIG. 3, a power recharger 200 for use with a robotic cleaner 10, which is referred to hereinafter as a "robot cleaner" which includes a recharging unit 200, preferably located in the corner of a room. The recharging unit 200 includes within it, at least one power supply/battery charger (not shown, but well known to those of ordinary skill in the art) the function of which is to recharge one or more batteries within a robot cleaner 10 from which a robot cleaner 10 obtains its operating power.

In the preferred embodiment, the recharger 200 has a body 210 that includes a power terminal 211 that provides an electrical connection between the recharger 200 and a recharging terminal 11 of the robot cleaner 10. A wall anchor member 220 is provided on the rear and front sides (not shown in FIG. 3) of the recharger body 210 to keep the power recharger 200 stable as a robot cleaner 10 impacts it but also to anchor the power recharger 200 against the wall 3 of a room.

In affixing the power recharger 200 to a wall, the anchor member 220 "reaches across" or spans the gap 2 determined by the thickness of the baseboard 2 trim piece that along the base of a wall 3, just above the floor 4 of a room in which the robot cleaner 10 will run. The anchor member 220 therefore supports the recharging unit body 210 and renders it stable.

In a preferred embodiment, the anchor member 220 extends from the body of the recharging unit 210 by a length that is appropriate for the size of the gap 2 between the wall 3 and the body 210 of the recharging unit 200. The distance that the anchor member 220 must span can be determined in a variety of ways.

Figure 4:
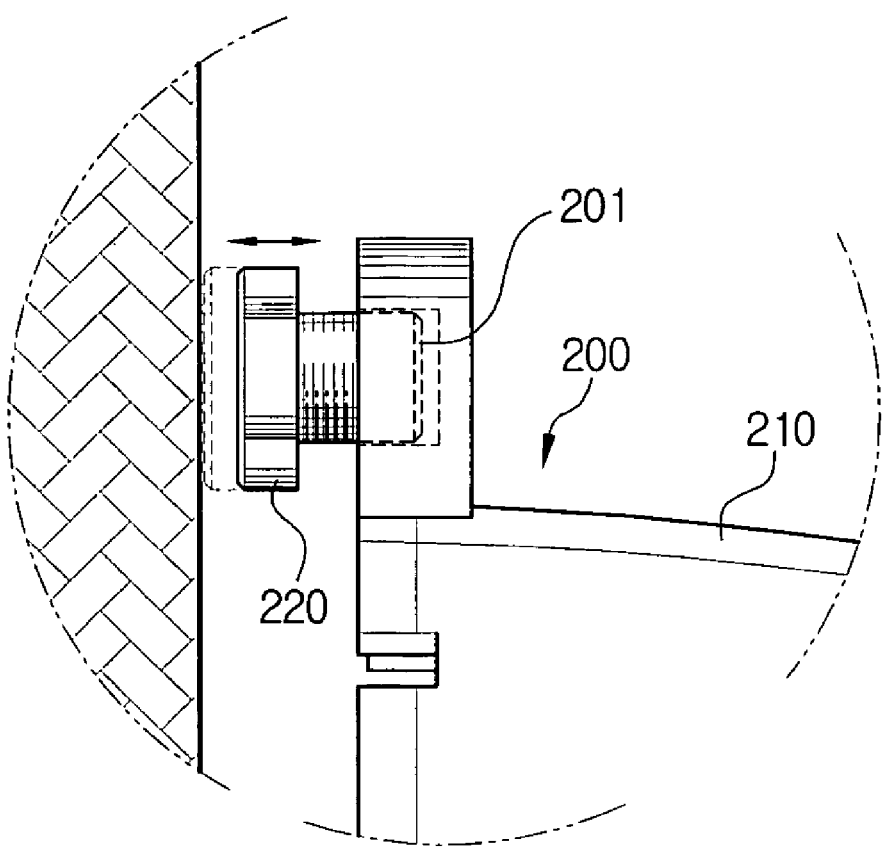
FIG. 4 is an enlarged view of circle 'A' of FIG. 3, illustrating the main part of the power recharger according to the resent invention to explain the operation thereof.

In one embodiment, the anchor member 220 resembles a threaded and adjustable leg for a refrigerator or other appliance, such as the threaded leg shown in FIG. 4. As can be seen in FIG. 4, the length of the threaded anchor member 220 can be adjusted by rotating the threaded leg in and out of a threaded screw hole 201 of the body of the recharging unit 210, to an appropriate length.

In another embodiment, the anchor member 220 may be configured as one or more blocks (not shown) of different lengths. Depending on the size of the gap 2 between the wall of the room and the body of the recharging unit 20, one or more blocks are selected and attached to the body of the recharging unit 210 to adjust the length of the anchor member 220.

Block spacer members can be attached to the recharging unit body 210 a number of ways. If they are ferrous, they can be attached to the recharging unit 210 magnetically, by either their magnetization of that of the recharging unit 210 body. Block spacer members can also be attached by way of adhesives, clips or screws, all of which are considered to be equivalents.

Another principal characteristic of the power recharger 200 for use with the robot cleaner 10 is a chamfered incline 230 formed at the lower part of the rear side of the recharging unit 210. The chamfered incline 230 compensates for wall 3 plumb variations and floor 4 level variations. The chamfered incline 230 allows the recharging unit 200 and the robot cleaner 10 to be stably engaged to each other and the robot cleaner 10 parked when the room walls 3 are not vertical (i.e. "plumb") and when the room floors 4 are not level.

According to the power recharger 200 described above, when a gap exists between the wall 3 and the power recharger 200, the anchor member 220 extends across the gap and as a result, the power recharger 200 can make a good electrical contact with electrical terminals 11 of the robot cleaner 10.

The foregoing embodiments are exemplary and should not be construed as being the invention or as limiting the present invention. The invention is as claimed in the appurtenant claims.

What is claimed is:

1. A power recharger for use with a robot cleaner, comprising:
   a recharging unit, which rests on the floor of a room, against a baseboard of the room, the baseboard having a height and a thickness and being attached to a wall of the room, the recharging unit having a height dimension that is greater than the height of the baseboard such that a top of the recharging unit is above the top of the baseboard, the recharging unit further having a recharging terminal to which a battery terminal of a robot cleaner can be docked; and
   a columnar anchor member comprised of a threaded rod, a portion of which is screwed into a threaded hole in the recharging unit body, rotation of the threaded changing the length of the columnar anchor, said threaded rod not penetrating the wall the wall to which the baseboard is attached, the columnar anchor member extending from a rear side of the body of the recharging unit, and located above the height of the baseboard and extending orthogonally away from the recharging unit toward a wall against which the columnar anchor member rests, the columnar anchor member having a length that is capable of being adjusted to be greater than the thickness of the baseboard and which allows the columnar anchor member to extend across the thickness of the baseboard to contact, but not penetrate or engage, the wall to which the baseboard is attached, the anchor member stabilizing the recharging unit upright against the baseboard and the wall when a robot cleaner impacts the recharging unit.

2. The power recharger of claim 1, comprising a chamfered incline surface formed on a bottom surface at the rear side of the body of the recharging unit.

3. The power recharger of claim 1, wherein the recharging terminal is above the top of the baseboard.

* * * * *